Aug. 8, 1933.   H. A. RECEN   1,921,840
BATTERY TERMINAL OR CONNECTER
Filed Feb. 2, 1932
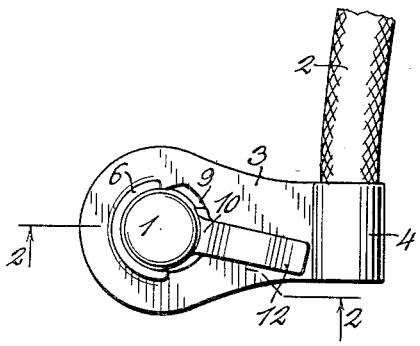
Fig. 1.
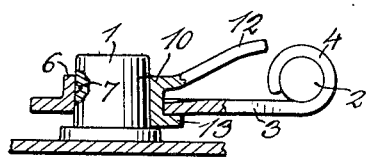
Fig. 2.
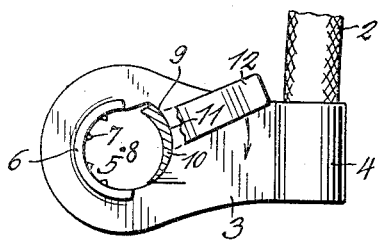
Fig. 3.
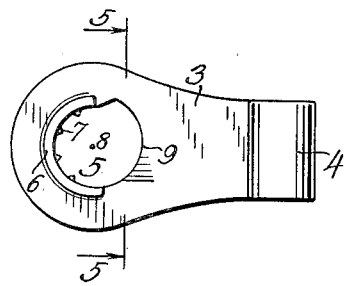
Fig. 4.
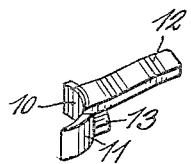
Fig. 6.
Fig. 5.
Inventor
Henry A. Recen.
By A. J. O'Brien
Attorney Patented Aug. 8, 1933

1,921,840

UNITED STATES PATENT OFFICE 1,921,840

BATTERY TERMINAL OR CONNECTER

Henry A. Recen, Kokomo, Colo., assignor of one-half to Charles W. Burnheimer, Kokomo, Colo.

Application February 2, 1932
Serial No. 590,359½

9 Claims. (Cl. 173—259)

This invention relates to improvements in battery terminals of the kind that are attached to the ends of cables and used for making connection with the terminal posts of storage batteries. Practically every automobile and truck are provided with a storage battery for lighting, ignition and starting purposes and it is frequently necessary to remove the batteries for charging and for cleaning. The ordinary battery terminal now in common use is provided with bolts for clamping the terminal against the terminal post of the battery, but experience has shown that owing to the action of the acid fumes the bolt and nut corrode to such an extent that it is practically impossible to loosen the bolt when the terminal is to be removed.

The difficulty pointed out has been recognized for a long time and many efforts have been made to produce a battery terminal of such construction that it can be readily attached and removed from the terminal post of the battery.

It is the object of this invention to produce a simple and substantial battery terminal that shall be so constructed that it can be easily clamped in position on the battery terminal post without the use of any special tools and which can also be readily removed.

Another object of this invention is to produce a battery terminal of such construction that it will make good electrical contact with the battery terminal post even if the latter is highly sulphatized and which will also have means for preventing the accidental removal of the battery terminal from the post.

In order to describe this invention so that it may be readily understood and so that its construction and mode of operation will be readily apparent reference will be had to the accompanying drawing in which the preferred embodiment thereof has been illustrated, and in which:

Fig. 1 is a top plan view of one of the improved battery terminals showing the same in position on a battery terminal post;

Fig. 2 is a section taken on line 2—2, Fig. 1;

Fig. 3 is a view similar to that shown in Fig. 1, but showing the battery terminal disconnected from the battery terminal post and a portion shown in section;

Fig. 4 is a top plan view of the body portion of the terminal showing the clamping member removed from the same;

Fig. 5 is a section taken on line 5—5, Fig. 4; and

Fig. 6 is a perspective of the clamping member.

In the drawing reference numeral 1 represents the terminal post of a storage battery and reference numeral 2 a cable. For the purpose of connecting the end of the cable to the post 1, a battery terminal or connecter has been provided which consists of a body member 3 which, in the embodiment illustrated, is made from a sheet of metal, one end of which is curved as indicated by reference numeral 4 and encloses the end of the cable 2 in the manner shown in Fig. 2. The cable is sweated to the body member 3 in the usual manner. The member 3 is provided with an opening 5. One side of this opening is bounded by a cylindrical wall 6 that extends substantially one hundred eighty degrees and is provided on its inner surface with a plurality of teeth 7. The inner surface of the wall 6 is curved about the center 8. The side of the opening opposite from the cylindrical wall 6 is formed by a curved surface 9 that is eccentric with respect to the center 8. Located within the opening is a clamping member 10. This clamping member is formed in part by an arcuate portion whose concave surface is cylindrical and curved about the same radius as the inner surface of wall 6. The outer surface of the arcuate portion of the clamping member has been designated by reference numeral 11 and this is eccentric with respect to the center of curvature of the inner surface. A handle 12 extends outwardly from the upper edge of the arcuate clamping member and a lug 13 is provided at the lower edge and this can be bent rearwardly as shown in Figs. 2 and 6 so as to hold the clamping member against accidental displacement. When the clamping member is in the position shown in Fig. 3, the opening is enlarged to such an extent that the battery terminal post 1 can be inserted into it. After the terminal post is in place, the handle 12 is moved in a clockwise direction, Fig. 3, and this rotates the arcuate clamping member and moves it along the curved eccentric surface 9 into engagement with the battery post. Owing to the clamping action obtained from the eccentric construction, a great clamping force can be obtained by a comparatively small force applied to the handle 12, and this force or pressure will cause the teeth 7 to embed themselves in the battery terminal post in the manner shown in Fig. 2. The action of the teeth 7 is to make good electrical contact with the metal of the terminal post and they also serve to hold the battery terminal against accidental removal.

At this point I desire to call attention to another feature of the construction which is best shown in Figs. 4 and 5. From these figures it will be seen that the eccentric wall 9 is curved or inclined with respect to the body of the battery terminal and that this inclination is downward in the direction in which the clamping member is moved for tightening the terminal. It will be seen that when the clamping member is rotated, it will be moved downwardly by the action of the inclined under surface of the part with which it is in contact and this will have a tendency to move the parts downwardly on the battery terminal post.

In the drawing the opening into which the cable end is inserted extends at right angles to the length of the battery terminal, but it can be in alignment with the same if desired and can make any other angle that is found necessary.

The battery terminal described above can be made of any suitable metal, but it should be coated with a layer of lead which will resist the action of the sulphuric acid better than that of any other metal.

From the above description it will be seen that I have produced a very simple battery terminal of such construction that it can be readily applied to and removed from the terminal post of a battery without the use of any special tools. In the construction shown the material used is preferably sheet metal of some kind, coated with lead as above described, but it can be made much heavier than shown in the drawing and also lighter if desired.

Having described the invention what is claimed as new is:

1. A battery terminal comprising a lug provided at one end with an opening for attaching a cable thereto and at the other end with an opening adapted to receive and encircle a battery terminal the last named opening having a wall formed in part by a cylindrical surface of substantially 180 degrees extent and in part by a cam surface eccentric with respect to the center of the cylindrical surface, a clamping member of concavo convex cross section located in the opening, the inner surface of the clamping member being cylindrical and when in one position substantially concentric with the corresponding cylindrical surface of the opening, the convex surface of the clamping member being eccentric and adapted to contact with the eccentric wall portion of the opening and a handle attached to the clamping member for turning the same.

2. A battery terminal comprising a lug provided at one end with an opening for attaching a cable thereto and at the other end with an opening adapted to receive and encircle a battery terminal, the last named opening having a wall formed in part by a cylindrical surface of substantially 180 degrees extent and in part by a cam surface eccentric with respect to the cylindrical surface, a clamping member of concavo convex cross section located in the opening, the inner surface of the clamping member being cylindrical and when in one position substantially concentric with the corresponding cylindrical surface of the opening, the convex surface of the clamping member being eccentric and adapted to contact with the eccentric wall portion of the opening and lugs extending inwardly from the cylindrical surface of the lug.

3. A battery terminal comprising a lug provided at one end with an opening for attaching a cable thereto and at the other end with an opening adapted to receive and encircle a battery terminal, the last named opening having a wall formed in part by a cylindrical surface and in part by a surface eccentric with respect to the center of the cylindrical surface, a clamping member of concavo convex cross section located in the opening, the inner surface of the clamping member being cylindrical and when in one position substantially concentric with the corresponding cylindrical surface of the opening, the convex surface of the clamping member being eccentric and adapted to contact with the eccentric wall portion of the opening and means on each side of the clamping member for limiting transverse movement in the opening in the lug.

4. A battery terminal comprising, a lug provided at one end with an opening for attaching a cable thereto and at the other end with an opening adapted to receive and encircle a battery terminal, the last named opening having a wall formed in part by a cylindrical surface and in part by a surface eccentric with respect to the center of the cylindrical surface, a clamping member of concavo convex cross section located in the opening, the inner surface of the clamping member being cylindrical and when in one position substantially concentric with the corresponding cylindrical surface of the opening, the convex surface of the clamping member being eccentric and adapted to contact with the eccentric wall portion of the opening, a handle attached to the clamping member for turning the same and means for moving the clamping member transversely in the opening when it is turned.

5. A battery terminal comprising, a lug provided at one end with an opening for attaching a cable thereto and at the other end with an opening adapted to receive and encircle a battery terminal, the last named opening having a wall formed in part by a cylindrical surface and in part by a surface eccentric with respect to the center of the cylindrical surface, a clamping member of concavo convex cross section located in the opening, the inner surface of the clamping member being cylindrical and when in one position substantially concentric with the corresponding cylindrical surface of the opening, the convex surface of the clamping member being eccentric with respect to the inner cylindrical surface and adapted to contact with the eccentric wall portion of the opening, a handle attached to the clamping member for turning the same and means for moving the clamping member transversely in the opening when it is turned, said last named means comprising a second cam surface carried by the lug.

6. A battery terminal comprising a lug provided at one end with an opening for receiving one end of a cable and at the other end with an opening adapted to receive and completely encircle a battery terminal post, the wall of the last named opening being formed in part by a cylindrical surface and in part by a surface eccentric with respect to the cylindrical surface, a cam member located in that portion of the opening whose wall is eccentric, the inner surface of the cam member being cylindrical and when in one position substantially concentric with the corresponding cylindrical wall of the opening, the convex surface of the clamping member being eccentric and adapted to contact with the eccentric portion of the opening wall.

7. A battery terminal comprising a lug provided at one end with an opening for attaching a cable thereto and at the other end with an opening adapted to receive and completely encircle a battery terminal, the last named opening having a wall formed in part by concave surface which forms an arc of substantially 180 degrees and in part by a concave cam surface that is eccentric with respect to the cylindrical surface, a clamping member located in the opening, the inner surface of the clamping member being concave and substantially cylindrical, the outer surface being convex and curved to fit the eccentric surfaces of the opening, the inner surface of the cam member being substantially concentric with the first mentioned cylindrical surface when the cam member is in one position, the wall of the cam member having a cross section of arcuate wedge shape and an angular extent of less than 180 degrees.

8. A device in accordance with claim 6 in which the cam member has a handle on one side for moving it and a lug on the other side for holding it in place.

9. A device in accordance with claim 7 in which the cam member has a handle on one side for moving it and a lug on the other side for holding it in place.

HENRY A. RECEN.